United States Patent [19]

Sinden et al.

[11] Patent Number: 4,796,152

[45] Date of Patent: Jan. 3, 1989

[54] MULTI RELAY SELECTION CONTROL CIRCUIT POWER LIMITER

[75] Inventors: Michael W. Sinden, Ballwin; Alexander Muller, Ellisville, both of Mo.

[73] Assignee: VonWeise Gear Company, St. Clair, Mo.

[21] Appl. No.: 145,543

[22] Filed: Jan. 19, 1988

[51] Int. Cl.[4] .......................... H01H 9/00; H02J 1/00
[52] U.S. Cl. .......................................... 361/192; 307/38
[58] Field of Search .................... 340/825.5, 825.51; 307/38, 41; 361/191, 192, 193

[56] References Cited

U.S. PATENT DOCUMENTS

| 2,787,731 | 4/1957 | Metzger | 361/193 |
| 3,422,318 | 1/1969 | Moody | 361/192 |
| 3,671,816 | 6/1972 | Ritzow | 361/193 |
| 3,691,431 | 9/1972 | Hendrickson et al. | 361/193 |
| 3,876,885 | 4/1975 | Catterall | 361/192 |

Primary Examiner—L. T. Hix
Assistant Examiner—David Porterfield
Attorney, Agent, or Firm—Irvin L. Groh; Alfred L. Patmore, Jr.

[57] ABSTRACT

An electrical relay control circuit for a plurality of controlled devices such as electric motors in which the current for actuation of the relays is regulated so that only a predetermined and precise amount of current will be available for operation of the relay coils and that current will be sufficient for actuation of only one relay thereby restricting operation to one controlled device at any one time.

7 Claims, 1 Drawing Sheet

MULTI RELAY SELECTION CONTROL CIRCUIT POWER LIMITER

BACKGROUND OF THE INVENTION

I. Field of the Invention

The present invention relates to control devices for selective operation of electrically powered units with means for regulating the number of such units that can be operated at any one time to thus insure safety of operation, limitation of power drains or both. In particular, the invention is useful in control of any motor driven units, or solenoid operated units, or the like, such as for example, those in hospital beds, or in dispensing devices. The invention is useful in situations where it is desired to prevent more than a predetermined number of functions from being set in motion at any one time. It is particularly useful where hand operated controls are needed together with isolation of users from power circuits.

II. Description of the Prior Art

Moody, U.S. Pat. No. 3,422,318, discloses a motor starter control circuit for a series of motors in which a series of starting switch sets having electro mechanical interlocks are arranged such that when a starting switch is closed, it will connect current to interlocks on all of the other starters and to a timer which will prevent starting of any other motor for a sufficient period of time to protect against motor current overload. This circuit will not prevent subsequent starting of additional motors but will only delay motor starting so as to restrict the power drain. Further, the electro mechanical devices used alone render Moody undesirable for use in hand-held controls or where controls must be of a minimum size.

Hendrikson et al, U.S. Pat. No. 3,691,431, discloses a vending machine control arrangement which includes selection switch means and relay means which apply current to vending drives, and wherein upon actuation of one set of switch means and relay, supply to other switches and relays is cut off. This system is also not one intended for use contemplated by the instant invention and is complex in nature and employs electro-mechanical elements. Nor does it meet the size limtiations imposed upon use in such as hospital beds.

Ritzow, U.S. Pat. No. 3,671,816, shows a solid state motor control circuit wherein electrical interlocks employing diodes will divert current from other switching circuits when one switch circuit is put into operation. The circuit employs time delaying means which is designed primarily to protect against simultaneously energizing relays. The system does not contemplate continuously preventing the operation of a second relay circuit while one is in operation.

Catterall, U.S. Pat. No. 3,876,885 discloses a series of relays for controlling the functioning of controlled units. The relays are interconnected so as to provide that when one is operated, others will not. Alterable time delay arrangements are provided whereby the sequence of the subsequent operation of the various relays can be controlled. The sequence is in part regulated by differences in the release time of time delaying-relay systems designed so that preferences among relays will change. Catterall does not disclose a relay system employing limited power output and switching means that may be hand-held in the manner contemplated by the instant invention.

SUMMARY OF THE INVENTION

The instant invention employs relay actuated power supply circuits controlled from hand-held type devices or by stationary switching banks of similar size affixed to beds, appliances, or the like, which it is contemplated will be operated by unskilled and relatively untrained persons yet which serve to effect relatively remote control of motors or other powered devices for achieving desired movements or operations without danger to the user either from electrical contact or from mechanical function.

The invention further provides means insuring operation of only one function at a time thus limiting possibility of harm to an operator or equipment and limiting current drain. The latter can be particularly significant where a large numbers of similar units might be employed such as in a hospital having many electrically operated beds.

According to the invention, alternatively selectable relay control is used in a power supply circuit to several powered devices. The relays are operable only by a control circuit separated from the power supply circuit. The control circuit employs relatively low voltage, as compared to that required for the power devices, and employs switching devices for alternately actuating the control relays. The control circuit voltage is in the order of 24 volts. This is below a dangerous voltage, and thus anyone operating a control circuit is not likely to be harmed by electrical shock due to faulty wiring, wear and tear, or abuse. Power supply for the power devices controlled by the relays is well removed from the control switches and will not be contacted even accidentially by one using the controller.

Further, the control circuit includes power limiting means limiting the total power available in such a manner that only one relay can be operated by control switch actuation at any one time. Power is restrained to the extent that total power output of the control circuit will only be sufficient to close one relay and then maintain the previously closed relay in closed position. There will be insufficient power to actuate another relay to closed position once one relay has been closed. Yet the control of operation of several devices such as devices for raising and lowering a bed, for raising the headrest section of the bed, and for raising and lowering a foot section of the bed can be effected entirely by a single person in whatever sequence desired. The sequence is not dictated by a control circuit, and operation is limited only to operation of one motion at a time.

In addition, the relay controlled power circuit for the powered devices is according to the invention arranged so that it also has a limiting function whereby the number of powered units that can be actuated is restricted by operation of a relay alone.

The invention further features a relatively simple electrical arrangement, as compared to many known controllers such as described above. This assists in controlling costs and minimizing space needed as well as the weight. This further enhances reliability and facilitates easy installation and operation together with flexibility of installation.

DETAILED DESCRIPTION OF THE PREFERRED EMBODIMENT OF THE PRESENT INVENTION

Figure 1:
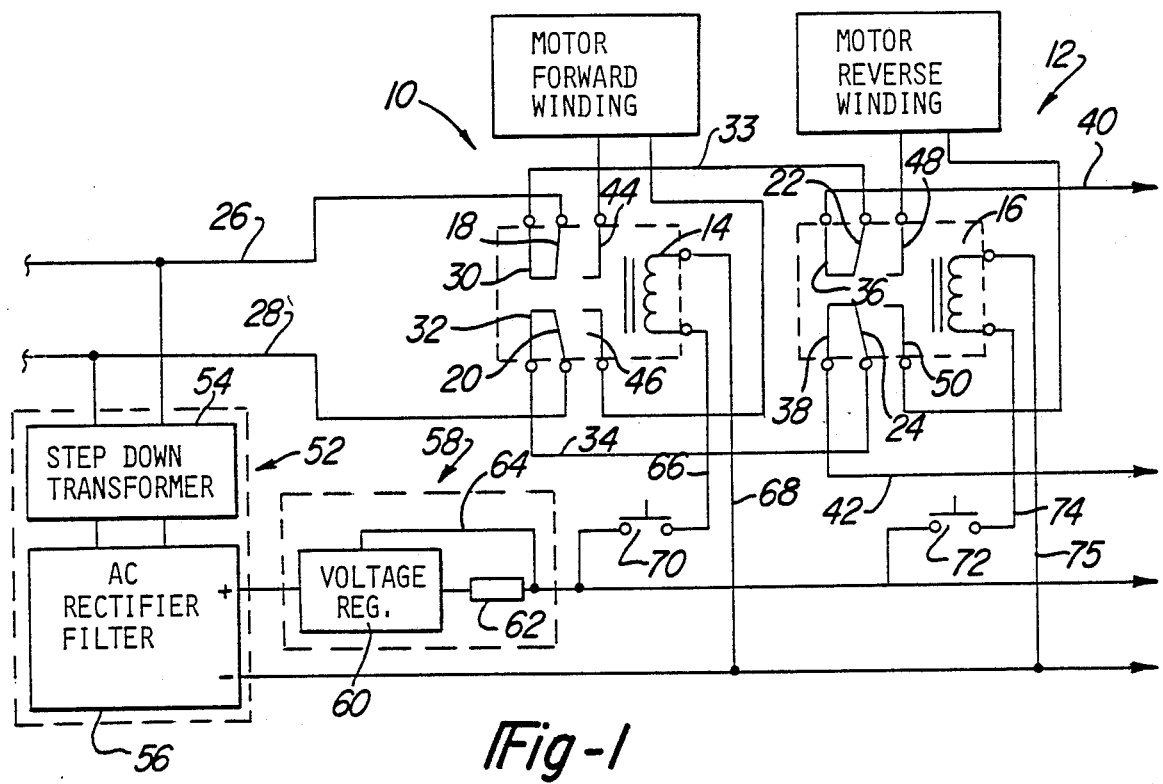
FIG. 1 is a fragmentary, schemmatic view of a circuit employing the invention.

Referring now to FIG. 1, a control circuit according to the invention is shown in use for controlling a motor forward drive winding and also the reverse winding of the same motor. On the other hand, instead of drives of the same motor, the control devices can obviously consist of separate forward and reverse motors, or in fact entirely separate devices for unrelated purposes. They can be solenoids or other devices or circuits of all kinds.

When used for forward and reverse drive, the control can be used to control the motions of a hospital bed having sections which can be separately adjusted as well a mechanism for raising and lowering the bed level. Various mechanical connections between drive motors and bed sections are well known, as are the motors suitable for use in such an environment. Motors of the same type might also be used in many other circumstances where forward and reverse movement is required.

In use in a hospital bed, it is most desirable that maximum safety and minimum discomfort be assured. Where several such motors are used for operating the bed, multiple operation is undesirable from the standpoint of both discomfort and safety.

Further, increasing current drains as would occur with unnecessary simultaneous operation of several powered devices by numerous persons, is undesirable in large hospitals or inns or the like.

As seen in FIG. 1, schematically depicted relays 10 and 12 are provided with armatures 14 and 16 which operate contacts 18, 20, and 22-24, respectively. Contacts 18 and 20 are shown in inoperative position and in such they are connected to power line leads 26, 28, by fixed contacts 30 and 32. When the contacts are in this position, the power line is also connected by leads 33 and 34 to contacts 22 and 24 of relay 12. The latter in turn are, when inoperative, in engagement with contacts 36 and 38 which connect to leads 40 and 42 and continue the power line connection to additional control relays similarily connected to the circuit. Upon operation of the relay 10, however, the contacts 18 and 20 will switch to engagement with contacts 44 and 46 and in doing so, connect the power source to the motor forward winding. Likewise, the relay 12 when operated to switch contacts 22 and 24 to contacts 48 and 50, will cause the reverse winding of the motor to be powered. It will also be seen that whenever a relay such as 10 or 12 is operated to connect its controlled device to the power supply, the power circuit will be broken at the operated relay, and relays serially connected subsequent thereto with respect to the power source, cannot connect their control devices to the power source because they will have been cut off by a higher order relay. This arrangement provides a means of preventing simultaneous action and can be used to provide priority ranking if desired.

The instant invention also provides a control circuit that positively prevents operation of more than one relay and its controlled device at any one time. Whatever the order in the power supply circuit, according to the invention, when one controlled device or winding is brought onto line, another one cannot be powered sufficiently to operate regardless of the position of its controlling relay in the power circuit. To this, there is also added the feature of providing a control arrangement for the relays and their associated devices which uses low voltage, and which isolates an operator from the line voltage required by the devices that are controlled. This virtually eliminates the risk of shock to users. This is particularly advantageous for use by persons confined to hospital type beds, for example.

As seen in the drawing of FIG. 1, the control circuit comprises a power supply 52. This power supply consists of a step down transformer 54 and a rectifier 56 coupled with a filter which steps down the voltage for the control circuit and produce DC current. The power supply is connected to the power line leads 26, 28. the control power supply is designed to produce power in the range of 24 volts DC.

There is also provided a current regulator circuit 58 which serves to maintain current available to the relay coils within a desired maximum range. Regulator-current limiting circuit 58 consists of a transistor, voltage regulator 60, a current limiting resistor 62 and a connection 64 between the "base" of the transistor regulator and the output side of resistor 62. The regulator circuit is in series within the power circuit that supplies the relay coils. Regulator 60 and the resistor 62 comprises a current regulator circuit which as connected functions as a power limiting circuit, and the power limiting voltage regulator- resistor circuit is matched to the relays and power supply so that only enough current is supplied to the relay circuit to close one relay at a time. The relays, is should be noted, are parallel connected to the control circuit and have equal access to control voltage and power. If the relays are substantially identically designed and arranged as in the circuit of FIG. 1, they will tend to draw current equally.

What is achieved by this arrangement of resistor-voltage regulator is a fixed current output from the regulator circuit rather than simply a voltage regulator. Thus the power is restricted.

Relay 10 is parallel connected to the DC control power supply by leads 66 and 68, and switch 70 is positioned in lead 66 such that it serves to make or break the circuit between relay 10 and the control current. Likewise, switch 72 serves to control connection of relay 12 by leads 74 and 75 to the control power source.

The design of the power supply and resistor combination is such that there is enough power available to initially close one relay and to maintain it in operated condition. However, the power supply is so limited that once this is done, the current then available is below that required to operate a second relay to close position. Therefore, if an operator accidentally closes a second switch while another is already functioning to maintain one relay closed, the total current from the regulator will remain the same and will be split between the two relays. For equal armature resistances the current will be equally divided. Since the energized relay requires less than one half of rated current to stay energized and the de-energized relay requires more than one half of rated curernt, the energized relay stays energized and the de-energized relay stays de-energized.

Figure 2:
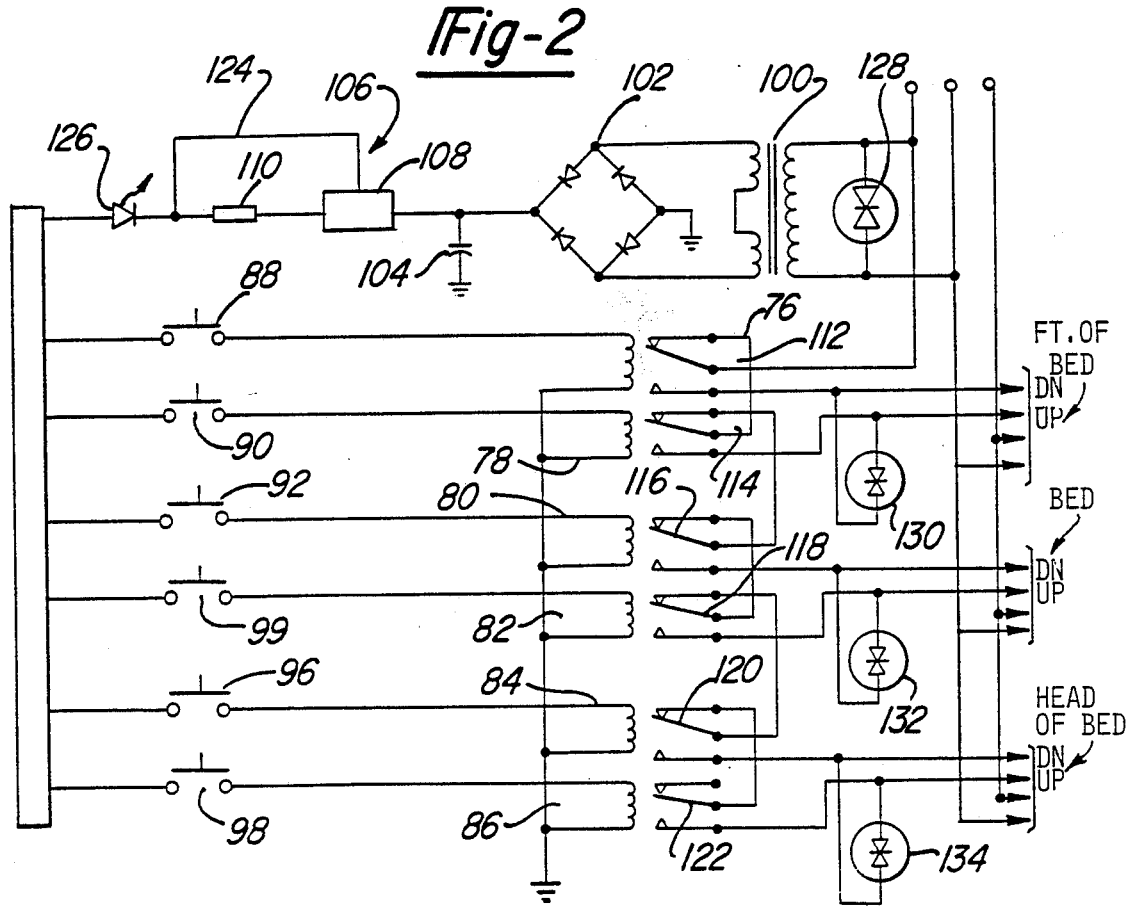
FIG. 2 is another schemmatic view of a circuit employing the invention.

FIG. 2 shows a second preferred form of the invention in which a series of relays 76, 78, 80, 82, 84, and 86 are utilized respectively to control, in this instance, up and down movement of the foot and head sections of a bed and the elevation of the bed frame. The coils of the relays are individually connected or disconnected to a control power supply by switches 88, 90, 92, 94, 96 and 98, respectively. The motors are controlled by the relays and are reversible and have two sets of windings, one for forward and one for reverse. The control power supply, as in the form of FIG. 1, consists of a step down transformer, 100, a diode rectifier bridge 102, and a filter capacitor 104. Also provided is the regulator-resistor current limiting circuit 106 including a transistor voltage regulator 108 and a limiting resistor 110. The relays control movable contacts of switches 112, 114, 116, 118, 120, 122 which through fixed contacts are, when all relays are open, connected by the movable contact of switch 112 and subsequent movable contacts in series to the power supply for the motors. As in the form shown in FIG. 1, each relay switch also contains a second contact which when closed by the movable contact will connect its controlled motor winding to the power source. Likewise when any one relay operates to the closed position it will break the motor power supply to all subsequent relays in series with it.

Furthermore, the control power circuit is regulated and limited as in the case of the form of the invention shown in FIG. 1 such that it will provide only enough current to operate one relay and to then maintain it in operating position, that is in closed position. For example, if the second switch 90, is inadvertently closed while switch 88 is closed there will be a division of current between the coils of the two relays 76 and 78 but that division will reduce the power available to the two coils to below that required to operate a relay. The current will however, still be above that needed to keep the previously closed relay 76 in closed position. It will be understood that the relays are normally biased to open condition.

In the circuit shown the selection of the relays, the resistors, the transformers, the transistor-regulators, the windings etc. is well within the scope of an average circuit designer. In the example shown in FIGS. 1 and 2, a 200 ohm ¼ watt resistor 110 and a Motorola Corporation 3 terminal voltage regulator number MC78L05C 108, are used to provide the regulator-current limiter with the rectifier and step down transformer being suitably matched thereto. A 220 mf filter 104 is also used in the form shown. The regulator-current limiter circuit 48 of FIG. 1 is identical to the regulator-power limiter circuit 106 and employs the same components. Lead 124, FIG. 2 and lead 64, FIG. 1 are the common leads of the three terminal transistor regulator circuits. 126 is a light emitting diode used as an on-off indicator. Suppressors 128, 130, 132, and 134 are used to limit high voltage surges.

The embodiments of the invention in which an exclusive property or privilege is claimed are defined as follows:

1. In a relay actuated power supply circuit having at least two alternatively selectable relays for controlling power input to individual driving means respectively controlled by said relays, each relay including means for alternatively connecting a current source to or disengaging a current source from a controlled driving means and a coil for effecting operation of each of the respective said relays, the improvement comprising:
    a voltage regulator-resistor circuit for supplying power to said relay coils including:
    a DC voltage source,
    a voltage regulator,
    a current setting resistor in series with said voltage regulator, said current setting resistor and said voltage regulator serving to provide constant current from said voltage regulator-resistor circuit,
    a series of relay coils,
    said relay coils being in parallel connection in said voltage regulator-resistor circuit,
    switching means respectively in connection with each of said coils and said circuit and each being operative to alternatively connect and disconnect one of said coils to said voltage regulator-resistor circuit for a respective supply of current to or a withdrawing of current from said one of said coils,
    whereby attempted operation of more than one of said relays to closed position will cause a splitting of the current available from said regulator-resistor circuit, as limited by said regulator and said resistor, between the coils of the latter said relays and wherein said circuit being arranged such that the current required for operating any one of said relays from a circuit open to a circuit closed position is greater than that required to maintain any one of said relays in a circuit closed position, and the total amount of current available from said voltage regulator-resistor circuit is restricted by said circuit to less than the power required to operate any one of said relays to a closed position from an open position while any other one of said relays is held in closed position by current from said regulator-resistor circuit, and only one of said relays can be operated to closed operative condition at any one time.

2. The relay actuated current supply circuit of claim 1 including:
    a step down transformer in series with said voltage regulator intermediate said regulator and a power source connection for said power supply circuit.

3. The relay actuated power supply circuit of claim 2 including a rectifier and filter intermediate said step down transformer and said voltage regulator for converting from AC to DC current in said control circuit.

4. The relay actuated power supply circuit of claim 1 including a rectifier and a filter intermediate said regulator and a power source connection for said voltage regulator-resistor circuit for converting AC voltage to DC voltage for use in said voltage regulator-resistor circuit.

5. The relay actuated power supply circuit of claim 1 including each of said relays having normally closed contact means with said contact means all being serially positioned with respect to each other in the current source line for said individual units for actuation of said controlled driving means and each being operable by its respective relay to break its serial connection in said current source line when its respective relay is actuated and connect its associated controlled driving means to said current source line.

6. The relay actuated power supply circuit of claim 1 wherein said circuit comprises a control for a unit having forward and reverse drive means, a first and a second relay each comprising two sets of pairs of contact means serially arranged in a power source lead for said forward and said reverse drive means, and each set being respectively operable to effect energization of one of the respective drive means of said unit,
    said contact means each being arranged in successive serial position along the power source lead for said drive means and said contacts of one of said relays being operative to break said power source connection to the contacts of the other of said relays and prevent power from reaching the other of said drive means upon the operation of said one of said relays to a closed position.

7. The relay activated power drive of claim 5 wherein upon actuation of one of said relays all relays subsequently positioned with respect to said one of said relays in series in said power source line will be unable to direct power from said power source to any unit controlled by any of the latter relays.

* * * * *